Nov. 4, 1930.　　　J. A. COSTUMA ET AL　　　1,780,780
TAXIMETER
Filed May 29, 1926　　　4 Sheets-Sheet 1
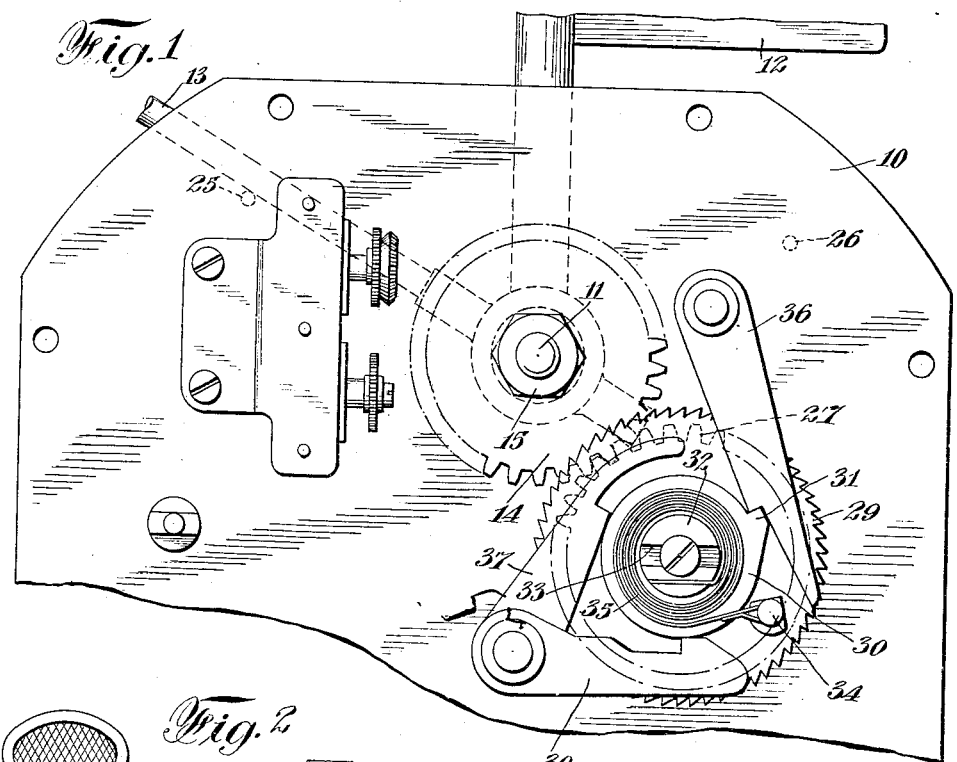
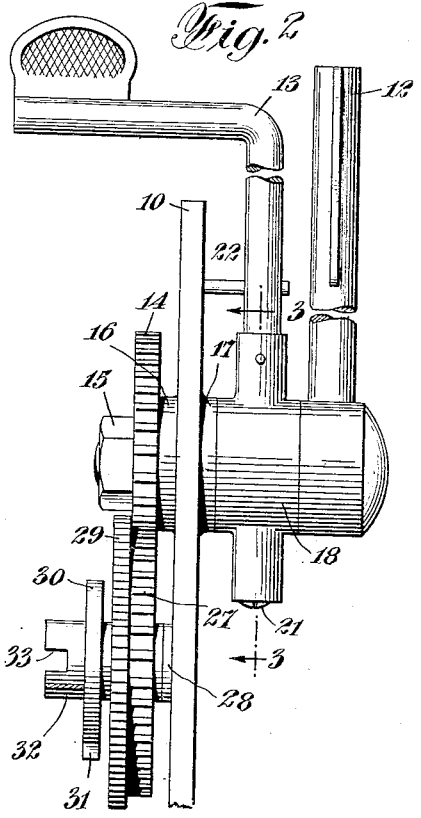
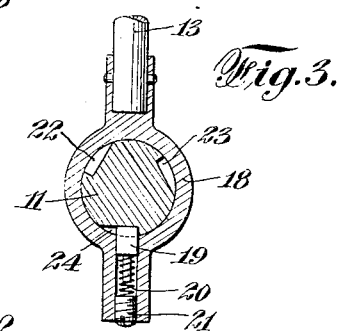
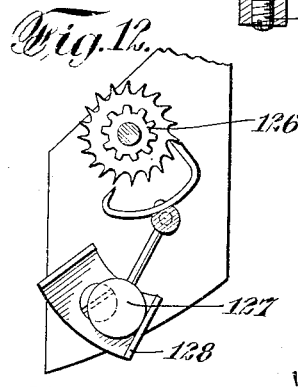
Inventors
Jacob A. Costuma
Harry E. Bauer
Charles L. Lovercheck
By their Attorney
Daniel L. Morris Inventors
Jacob A. Costuma
Harry E. Bauer
Charles L. Lovercheck By their Attorney
Daniel L. Morris

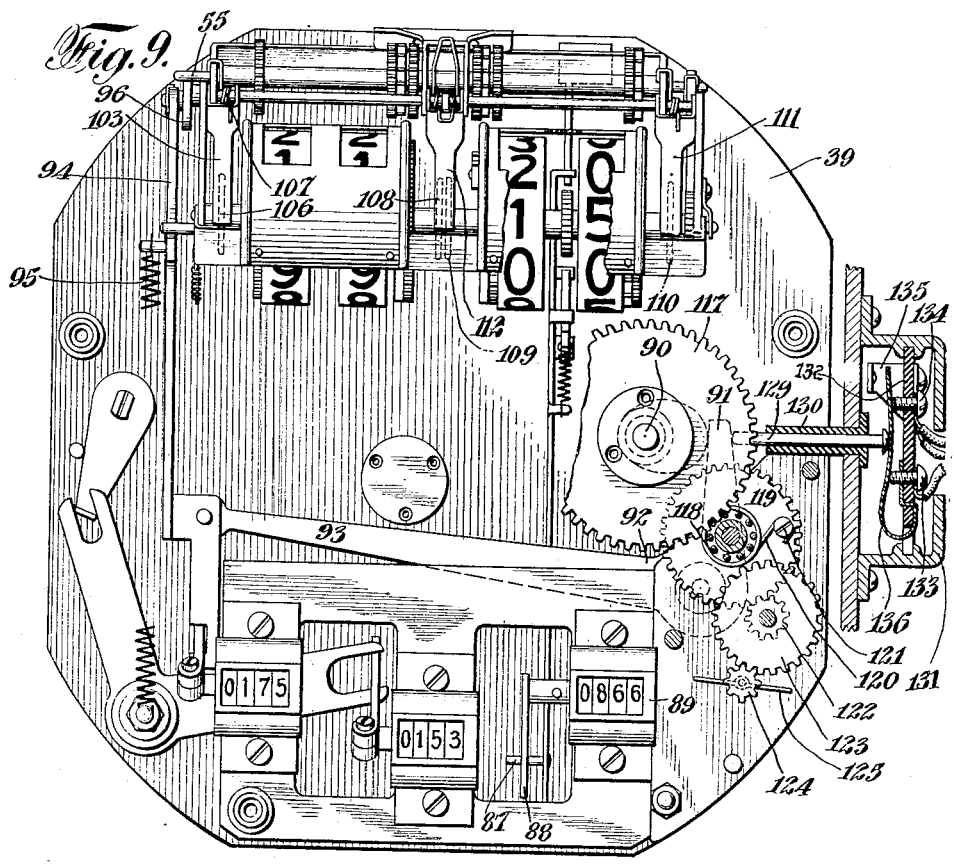

Patented Nov. 4, 1930

1,780,780

UNITED STATES PATENT OFFICE

JACOB A. COSTUMA AND HARRY E. BAUER, OF NEW YORK, AND CHARLES L. LOVER-CHECK, OF BROOKLYN, NEW YORK, ASSIGNORS TO INTERNATIONAL TAXAMETER CORPORATION, OF NEW YORK, N. Y., A CORPORATION OF NEW YORK

TAXIMETER

Application filed May 29, 1926. Serial No. 112,442.

The invention broadly relates to improvements in fare indicators, and in its more intense aspect relates to improvements in fare indicators more particularly adapted for use in connection with public conveyances and taxicabs, and whose functions are to visually indicate to the passenger the amount of fare owed by him at any stage of his journey, and by means of suitable registration mechanisms to ring up the total amount of fare collected so as to enable the owner of the conveyance to keep an accurate check on the driver to prevent him from practicing fraud and dishonesty with regard to the amount of money collected.

The fare indicator of the present invention is of the general type disclosed in the patents to Alonzo G. Decker, No. 1,058,222 granted April 8, 1913, and No. 1,013,279 granted January 2, 1912, and in the pending applications of Charles A. Fausel and Harry E. Bauer, Serial No. 664,361 filed September 24, 1923, and Serial No. 673,065 filed November 6, 1923.

In the present application, we have shown only such parts of the fare indicator as are essential to a full understanding of the invention, reference being had to said patents and applications for a full and complete disclosure of the mechanisms and structures not specifically described in the present application.

Municipalities have practically universally enacted ordinances controlling the traffic of taxicabs which vary more or less in their nature. Every municipality, however, has an ordinance to the effect that the driver of a taxicab must indicate in some manner whether his cab is vacant or occupied so that the public may be easily aware thereof. A means which has been employed for this purpose is a flag which is adapted to be raised and lowered, in one position indicating that the cab is occupied and in another that the cab is vacant. Such a flag is subject to several disadvantages. First, it is not conspicuous and cannot be readily seen at a distance or at night and on dark days, and second, a dishonest driver can so manipulate (or "jockey") the flag as to give the appearance that his cab is occupied when it is not, and vice versa. It became necessary to devise means more effective than the flag to indicate the condition of the conveyance, and illuminating devices of various characters and operating in various ways have been devised and employed.

One object of the present invention is to provide illuminating means which will indicate in a prominent manner whether or not the conveyance is occupied and which are so designed that they are automatically operated by the fare indicator and their control is taken entirely out of the hands of the driver of the conveyance.

A more specific object of the invention is to provide automatic means of this character which comprise a plunger operated from the cam shaft of the fare indicator and a switch device actuated by the plunger and controlling the illuminating means.

Another object of the invention is to provide automatic means of the above nature characterized in their simplicity, low cost of manufacture, and effectiveness in operation.

A further object of the invention is to provide in connection with the automatic operating means, an illuminating device which is of simple character and which is effective in operation.

Another object of the invention is to provide with the illuminating device, key operated means which are of such character as to render the illuminating device inoperative, or operative depending upon the position of the key operated means.

By the employment of said means, the owner of the conveyance may be assured that the driver will not take the conveyance without his permission, for, if the driver does take it, he will be stopped by police officers or other persons of authority who will note that the illuminating device or signal is not functioning. Keys may be held also by those having proper authority and whose business it is to look after the public welfare, so that, should the driver be guilty of misconduct in the discharge of his duties, the illuminating device of his conveyance may be rendered inoperative, and he will be unable to use his conveyance further without being stopped by the police. Of course, the foregoing presupposes the existence of an ordinance making it requisite that public conveyances be equipped with these illuminating devices and that they only operate when said illuminating devices are functioning.

Another object of the invention is to improve the flag operating mechanism of the fare indicator with a view to simplifying the same and cheapening the construction thereof.

Another object of the invention is to provide improvements in the registering mechanism of the fare indicator to enable said mechanism to function in a more efficacious manner.

A further object of the invention is to improve and render more effective the resetting apparatus of the fare indicator.

Still another object of the invention is to provide in connection with the fare indicator improved damping means which serve to absorb the vibrations and protect the various structures thereof, and function as an effective brake.

With these and further objects in view, the invention also resides in certain new and novel details of construction, arrangement of parts and combination of elements which are more specifically and particularly pointed out in the following description of the accompanying drawings in which we have disclosed, for the purpose of illustration, one particular embodiment of the invention.

In the drawings:

Figure 1 is a front view of the back plate showing the flag operating mechanism and the automatic control mechanism.

Figure 2 is a side view of Figure 1.

Figure 3 is a cross sectional view on the line 3—3 of Figure 2.

Figure 9 is a view looking at the front plate and with parts broken away to illustrate clearly the shutter operating, resetting, automatic electrically illuminated indicating, and damping means.

Figures 10 and 11 are side views showing in detail the shutter operating and resetting mechanisms and the manner in which they function.

Figure 12 is a view of a modified form of damping mechanism that may be employed with the fare indicator.

Flag operating and automatic control mechanisms

Figure 4:
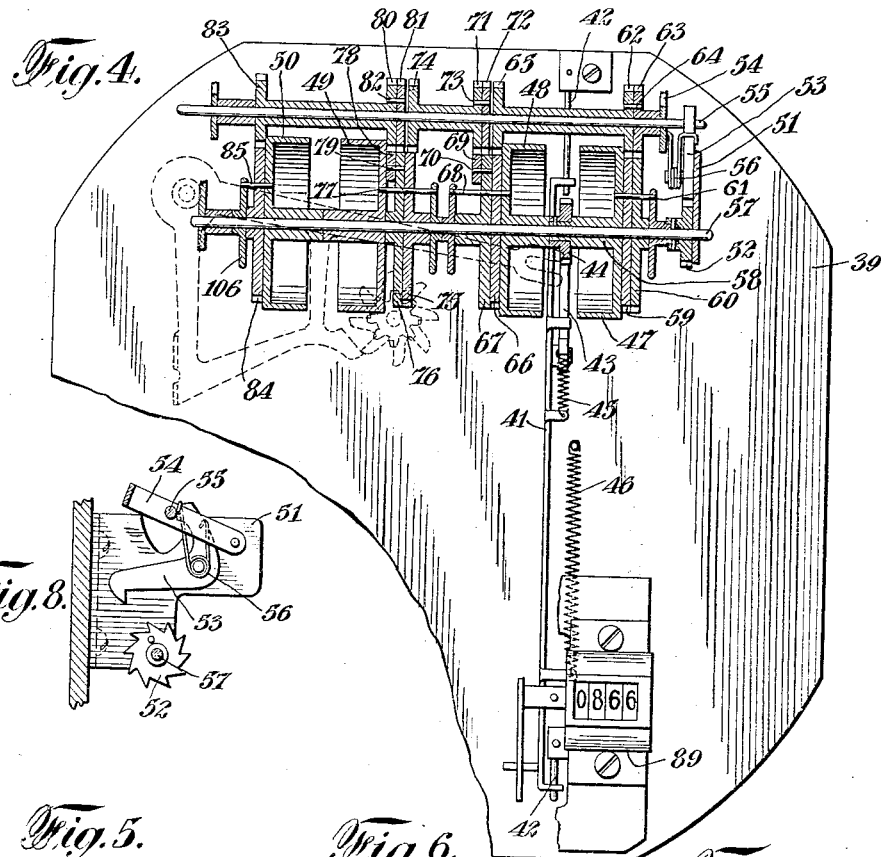
Figure 4 is a partly sectional view showing the fare registering mechanism.

The back plate 10 of the casing has a shaft 11 extending therethru which carries on the exterior side of the back plate a flag 12 and an operating handle 13, and on the interior side of the back plate a gear 14. The shaft 11 with the flag 12 and operating handle 13 associated therewith is inserted thru a hole from the exterior side of the casing and the gear 14 is slipped over the end of the shaft and is clamped in place by any suitable means, such as a nut 15. A flange 16 is preferably employed between the gear 14 and the back plate 10 and a similar flange 17 is employed between the handle 13 and the back plate 10 in order that the device may operate with a maximum mechanical efficiency, and be of correct mechanical design.

The operating handle 13 is associated with the shaft 11 thru a ratchet mechanism, the character of which is more clearly shown in Figure 3. A loose sleeve 18 to which handle 13 is joined as by a rivet or other means adapted for the purpose, surrounds the shaft 11 and is adapted to be operatively associated therewith by the ratchet mechanism. This mechanism comprises a plunger 19 which is urged towards the shaft by a spring 20. The plunger and the spring are inserted thru a suitable hole in the sleeve 18, and after being so inserted, a set-screw 21 is screwed into the hole from the exterior end thereof. It will be understood that the spring 20 bears against the set-screw 21 and that its compressive action may be varied by varying the position of the set-screw. The shaft 11 is provided with notches 22, 23 and 24 arranged at an angle on its circumference of exactly 120 degrees. The plunger 19 is adapted to project into these notches. Each of these notches are formed with two sides, one of which is radial and the other of which is approximately at a right angle thereto. Thus, it will be seen that when the handle 13 is turned in one direction, that is, clockwise, as seen in Figure 1, or counter-clockwise as seen in Figure 3, the plunger 19 bears against the radial side of the notch and causes the shaft 11 to rotate, whereas when the handle 13 is turned in the opposite direction, that is counter-clockwise as seen in Figure 1, or clockwise as seen in Figure 3, there is no abutment on the shaft 11 on which the side of the plunger 19 may bear and consequently there is no turning motion imparted to the shaft by the handle.

The back plate 10 has projecting therefrom on its exterior side, two pins or stops 25 and 26, the purpose of which is to control the movement of the handle 13 and to determine its stroke. These two pins are so arranged that the two extreme positions of the handle 13 are exactly 120 degrees apart. It will be apparent that when the ratchet handle 13 is moved back and forth between the two stops, the flag 12 is caused to rotate in an intermittent manner and stops at three positions, 120 degrees apart, one of which is vertical. The vertical position indicates that the conveyance is "vacant" or "for hire" and the other two positions are the "hired" position and the "cash" or non-recording position.

In Figures 1 and 2, in connection with the flag operating mechanism, we have shown the automatic control which serves to automatically put the fare indicator in full operation when the position of the flag is moved only a small angle from the vertical, and to completely take the fare indicator out of the control of the driver so that the fare will always be correctly indicated. The automatic control is not a part of the present invention, however, as it is claimed in the Fausel and Bauer application, No. 664,361, filed September 24, 1923. We have shown it in the present application in order that its relation with the flag operating mechanism and other improved features may be clearly apparent.

The gear 14 drives the gear 27 which is loosely mounted on the shaft 28. The specific internal construction of the various parts will not be herein described as they are disclosed in the Fausel and Bauer application referred to above. On the shaft 28 and secured to the gear 27 is a ratchet wheel 29 which is engaged by a pawl (not shown) to prevent reverse movement of the gear and ratchet wheel combination. An escapement wheel 30 is rotatably mounted on the shaft 28 and is provided with a tooth 31 on its periphery. The escapement wheel 30 has a hub portion, 32, secured thereto which hub is provided with a slot 33. A pin 34 is fixedly secured to the side of the ratchet wheel 29 and secures one end of the spiral spring 35 to said ratchet wheel. The other end of the spring is fastened to the hub in any suitable manner. The hub drives the cam shaft 90 (see Figure 9) of the fare indicator thru any suitable operating connection.

A plurality of levers 36, 37 and 38 are associated with the escapement wheel and engage with the tooth 31, thereof in one of the three positions the flag is adapted to assume. In Figure 1, the flag is shown in its vertical or "vacant" position and the lever 36 is shown in locking engagement with the escapement wheel. When the handle 13 is manipulated and the flag lowered, the gear 14 rotates the gear 27 and its associated ratchet wheel 29 as a unit on the shaft 28 and in a counter-clockwise direction, as seen in Figure 1. The escapement wheel, and consequently its hub, are held against movement by the locking engagement of the escapement wheel and the lever 36 and therefore the spiral spring 35 is wound up on the shaft. As the ratchet wheel 29 revolves, the pin 34 is carried around with it and after a predetermined amount of rotation its face will strike the face of the lever 36 causing said lever to swing out of locking engagement with the escapement wheel. The energy stored in the spring will then cause the escapement wheel to rapidly rotate in a counter-clockwise direction as seen in Figure 1. The escapement wheel will carry with it the cam shaft 90 by means of the rotation of the hub 32 and the operating connection between the same and the cam shaft, and will continue to rotate in a counter-clockwise direction until the tooth 31 strikes the notch in the next lever 37 in which position it will stop. This position is the "hired" position. When the lever 36 is moved out of locking engagement with the escapement wheel, the control of the entire fare indicator is out of control of the driver of the conveyance and it is automatically set in its registering position.

The peculiar advantages of the automatic control are described at some length in the Fausel and Bauer application and we will not expand on them here. We have shown this mechanism in the present application in order that the nature of our improvements may be more readily apparent and their adaptation to the fare indicator appreciated.

Fare registering mechanism

Fare indicators of the type to which our invention appertains are designed to register both according to the distance traveled and the time consumed. When the fare indicator is in its "hired" position and the conveyance is traveling at normal speed, the fare indicator registers according to the road drive but when the conveyance is standing or traveling at a very low speed, the fare indicator registers according to the time. The means for communicating motion from the road or from the clock work mechanism of the fare indicator are shown in detail in the patent to Decker, No. 1,058,222, and the salient features thereof are indicated in Figure 4 of the drawing in dotted lines, in order to show that they are situated in back of the main plate and within the interior of the fare indicator.

The cam shown in dotted lines in Figure 4 corresponds to the cam 58 of the Decker patent and its rotation is caused either by the road drive or by the clock work mechanism of the fare indicator. When rotating the cam actuates the bell-crank lever which is also shown in dotted lines in Figure 4 and causes oscillation thereof. One end of this lever is forked and engages the pins 40 (Figures 5, 6 and 7) carried by the sliding rod 41. The sliding rod is guided in its movements by any suitable means such as the pins 42 which are supported on the main plate 39. Pivoted near the top of the sliding rod is a pawl element 43 which is adapted to engage with and actuate the indicating wheel ratchet 44 and which is held thereagainst by the spring 45. A spring 46 is secured to the sliding rod and tends to hold it in its upper or retracted position, that is, in the position shown in Figure 6.

From the description so far, it will be apparent that as the bell-crank lever oscillates, the sliding rod 41, due to the operative connection between the forked end of the lever and pin 40 reciprocates in synchronism with the oscillations of the lever and actuates thru the medium of the pawl pivoted thereto, the indicating wheel ratchet causing fares to be rung up on the fare indicating wheels 47, 48, 49 and 50. The wheels 47 and 48 indicate the fare in cents and the wheels 49 and 50 indicate the fare in dollars and they are operated and caused to register by means of the intermittent rotary motion imparted to the ratchet 44 which is communicated to the fare indicating wheels in the manner more particularly described hereinafter. It will be noted that the cam acts in such manner as to positively move the sliding rod downward and the pivoted pawl out of engagement with the ratchet against the action of the spring 46 and that when the lever is released by the cam, the spring 46 urges the sliding rod to its upward position into engagement with the ratchet.

Figure 8:
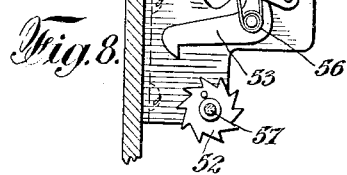
Figure 8 is a view of the mechanism employed to prevent reverse rotation of the indicating wheel shaft.

In order to prevent reverse movement of the ratchet wheel and to secure accurate registration we provide means of the character indicated in Figure 8. The bracket 51 is secured to the main plate 39 in any suitable manner and carries pivoted thereto the ratchet 52 and the pawl 53. The ratchet wheel 52 is on the same shaft as the ratchet 44 and is rigidly secured thereto. When the fare indicator is in its inoperative or "vacant" position, the arm 54 which is pivoted to the bracket 51 and which carries the gear shaft 55 is in its raised position as shown in Figure 8. Because of the engagement of the shaft 54 with the rear end of the pawl 53, the pointed end of the pawl is lifted out of engagement with the ratchet 52. When, however, the fare indicator is in its operating or "hired" position, the arm 54 is down and the pointed end of the pawl engages with the teeth of the ratchet 52 and prevents reverse rotation of said ratchet wheel and consequently of ratchet wheel 44. A coil spring 56 encircles the pivoted pin of the pawl 53. One end of this spring bears against the pawl and the other end against the arm 54 in such manner as to yieldingly maintain the pawl in engagement with its ratchet wheel. Due to the use of this spring, a successful functioning of the pawl is assured.

The fare indicator only registers when the shaft 55 is in its lower position and the gears thereon mesh with the gears on the shaft 57 which carries the fare indicating wheels. The ratchet wheel 44 is secured to the hub 58 of the fare indicating wheel 47 by means of a pin or other equivalent means. The ratchet wheel 44, and consequently the ratchet wheel 52, also, are provided with ten teeth or notches so that for every oscillation of the bell-crank lever and resulting reciprocation of the sliding rod 41 the ratchet wheels and indicating wheel 47 make one-tenth of a revolution. As it rotates, the indicating wheel 47 carries with it the gears 59 and 60 which are secured to it by means of a pin 61. Thus it will be seen that the ratchet wheels, fare indicating wheel, and gears 59 and 60 rotate as a unit loosely about the shaft 57 due to the action of pawl 43 upon the ratchet wheel 44.

As the gears 59 and 60 rotate they cause rotation of the gears 62 and 63 which are loosely mounted on the shaft 55 and which are secured together by means of a pin 64. The gear 65 is integrally formed with the gear 62 and rotates therewith. The gears 66 and 67 are secured together by means of a pin 68 which also secures the indicating wheel 48 to them. The gears 66, 67 and the indicating wheel 48 turn loosely on the shaft 57 as a unit as the gear 65 drives the gear 66. The train of gears is so designed that for every alternate tenth of a revolution that the indicating wheel 47 makes, the indicating wheel 48 makes one-tenth of a revolution. Thus by arranging numerals on the peripheries of the said indicating wheels in the manner shown in Figure 9 said indicating wheels are caused to register fare in cents in increments of five cents up to one dollar.

Rigidly secured to the gear 67 and near its periphery is a tooth 69 which revolves with the gear and drives as a unit the gears 71 and 72 which are joined together by the pin 73. The gear 74 is integrally formed with the gear 71 and therefore the gear unit comprising gears 71, 72 and 74 intermittently rotate as a unit due to the action of the tooth 69. Gears 75 and 76 and the fare indicating wheel 49 are rigidly joined together by a pin 77 and rotation thereof is caused by the gear 74 driving the gear 75. This train of gears is so designed that at the end of every complete revolution that the fare wheel 48 makes, the fare wheel 49 is caused to turn one-tenth of a revolution. Thus by arranging numerals on the fare wheel 49 in the manner shown in Figure 9 said fare wheel is caused to register the fare in increments of one dollar up to ten dollars.

The tooth 78 is secured to gear 76 near its periphery by means of a pin 79 and drives the gear unit comprising gears 80, 81 and 83 which rotate as a unit loosely on the shaft 55, it being understood that the gears 80 and 81 are secured together by a pin 82 or some equivalent means. The gear 83 drives the gear 84 and with it the indicating wheel 50 thru the medium of a pin 85. This train of gears is so designed that at the end of every complete revolution of the wheel 49, the wheel 50 makes one-tenth of a revolution. Thus by arranging the numerals on the indicating wheel 50 in the manner shown in Figure 9, said indicating wheel is caused to register the fare in increments of ten dollars up to a hundred dollars.

The gears, 60—63, 66—72, and 76—81 are really guide gears and do not perform any driving function. Such guide gears are necessary in view of the wide pitches of the driving gears necessarily employed in order to obtain the requisite motion of the fare indicating wheels.

In the foregoing description, we have used numerals to illustrate the fare registering device which numerals conform to the prices generally charged by taxicabs at present, that is, a fifteen cent charge for the first fifth or quarter mile and a five cent charge for every subsequent fifth or quarter mile. It will be obvious, however, that the registering mechanism is such that it can register the fare accurately from one cent up to one hundred dollars, merely, by providing the fourth or cent wheel with numerals ranging from zero to nine. In the fare indicators of the Decker patents, and, in all indicators, in fact, prior to our invention, there are only three rotatable wheels, the fourth or cent wheel being fixed at zero, so that the prior fare indicators, such as shown by Decker, are only capable of registering the fare in ten cent units. The present invention is a vast improvement in that it is capable of registering the fare in cent units up to one hundred dollars beginning with the initial charge for any given distance, and after the initial charge has been earned, immediately registering a different charge for any fraction of the initial distance. It is apparent that this registering mechanism can be employed in connection with any decimal monetary system.

Figure 5:
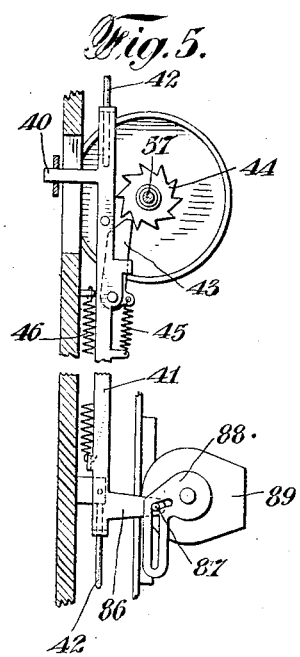
Figures 5, 6 and 7 are side views showing details of this mechanism in operation.
Figure 6:
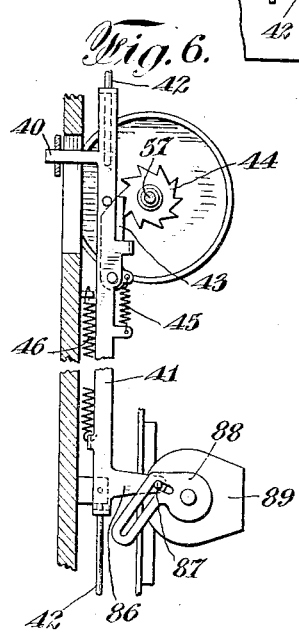
Figure 7:
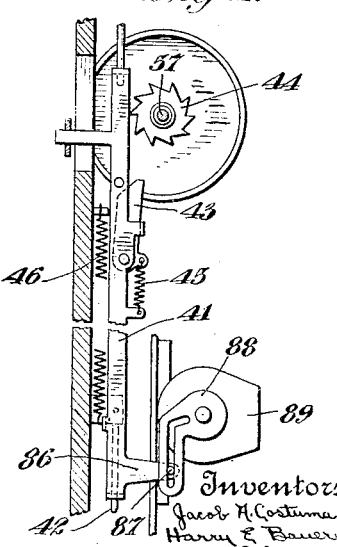

The sliding rod 41 carries near its lower end an arm 86 provided with a pin 87. This pin is adapted to move in the slotted cam 88 and to cause oscillations of the slotted cam in synchronism with the reciprocations of the sliding rod 41. The slotted cam as it oscillates drives thru any suitable mechanism (not shown) to cause the register or fractional veeder 89 to ring up the total number of earned fractional units. The particular type of slot shown in the cam in Figures 5, 6 and 7 is necessary in order that the sliding rod can move sufficiently far downward under the action of the bell-crank lever to completely disengage the pawl 43 from the ratchet wheel 44 when the fare indicating wheels are being reset.

*Shutter operating and resetting mechanism*

When the fare indicator is in its vacant or "for hire" position, the numerals on the indicating wheels are covered by a shutter and can not be seen, but when it is turned to its "hired" position, the shutter is lowered and the numerals on the fare indicating wheels are exposed to view. The wheels are so set that upon lowering of the shutter they indicate an initial charge, which according to present commercial standards in taxicab traffic is fifteen cents. Sometimes in the fare indicator means are provided which act on the bell crank lever of the registering mechanism in such a way as to prevent the sliding rod 41 from operating until the initial charge is earned. In many cases, however, the distance traveled to earn the initial charge is the same as that to earn the subsequent five cent charges and no such means are necessary. Means of this character do not form any part of the present invention and we have not illustrated the same.

After the passenger has completed his journey and alighted, the driver of the conveyance turns the fare indicator to its vacant or "for hire" position. The shutter is automatically lifted to cover the numerals of the fare indicating wheels and the indicating wheels are automatically reset so that when the fare indicator is again turned to its "hired" position, the shutter upon being lowered will expose the initial charge to the view of the passenger.

The shutter operating and resetting mechanisms of the present invention are more particularly shown in Figures 9, 10, and 11. The shaft 90 is operated from the hub 32 thru any suitable operating connection, carries on it a cam which is shown in dotted lines in Figure 9 and which has a raised portion adapted to act on a short arm 91 of the bell crank lever 92. This bell-crank lever is pivoted to the main plate 39 and has a long arm 93 extending across the main plate. The arm 93 is pivotally connected to the rod 94 and actuates the same. The rod 94 is biased to its lower position by means of a suitable spring 95. At its upper end the rod 94 is pivotally connected to the arm 96 which is pivoted on the shaft 97. This shaft is carried by the bracket 98 and the bracket is secured to the main plate 39 in any suitable manner. The gear shaft 55 is carried by the arms 54 and 96 and therefore when the arm 96 is caused to oscillate due to the movement of the rod 94, the shaft 55 is lowered or raised causing the gears thereon to mesh and unmesh with the gears on the shaft 57, carrying the indicating wheels. The rod 94 is further provided with a cam shaft projection 99 which is adapted to act on a pin 100 carried by a shutter 101. The shutter is pivotally mounted, as indicated in Figures 10 and 11, on the shaft 57 in any suitable manner. When the rod 94 is in its upper position, the cam projection 99 acts upon the pin 100 causing the shutter to be lifted and the numerals on the indicating wheels to be covered thereby. When the rod 94 is in its lowered position, the shutter falls due to the action of the spring 102 and uncovers the numerals of the indicating wheels to expose the same to the view of the passenger.

Thus it will be seen that when the raised portion of the cam on the cam shaft 90 acts on the short arms of the bell-crank lever 92, the rod 94 is automatically raised to cover the numerals on the fare indicating wheels and the shaft 55 is also automatically raised to cause the gears thereon to unmesh with the gears on the shaft of the fare indicating wheels. This position of the cam is shown in Figure 9 and it corresponds to the vacant or "for hire" position. When, however, the fare indicator is turned to its "hired" position the raised portion of the cam no longer co-acts with the lever arm 91, the rod is retracted to its lower position by the spring 95 and allows the shutter to automatically fall to expose to the view of the passenger the numerals on the fare indicating wheel and also allows the shaft 55 to automatically fall to cause the gears thereon to mesh with the gears on the shaft of the fare indicating wheel.

When the shutter and the shaft 55 are in their lowered position, the arm 103 which is pivoted on the shaft 97 is held outwardly as shown in Figure 11 by the stop element 104 and when the shutter and the gear shaft 55 are raised, the stop element 104 is swung out of engagement with the arm 103 and allows the oblique end 105 of said arm to be urged into engagement with the heart-shaped cam 106 by means of a spring 107 which is coiled around the shaft 97. The heart-shaped cam 106 is rigidly secured to the indicating wheel 50 by means of the pin 85. Under the action of the spring-pressed arm, the cam is rotated until the pin end of the arm engages with the concave portion of the heart-shaped cam in the manner shown in Figure 10 in which position the cam and the fare indicating wheel will stop. This is the initial starting position of the indicating wheel. Similarly heart-shaped cams 108, 109 and 110 are secured with the indicating wheels 49, 48 and 47 respectively by pins 77, 68 and 61 respectively and under the action of spring-pressed arms 111 and 112 rotate said indicating wheels to their initial positions when the fare indicator is turned to its vacant or "for hire" position.

A swinging bracket 113 is pivotally supported on the shaft 97 and carries a plurality of projecting fingers 114, each of which is provided with a downwardly extending nib 115. When the gear shaft 55 is lifted by the arm 96, the nibs on the fingers engage with the gears on the gear shaft and position them so that when the shaft is again lowered, said gears will fall into mesh easily with the gears on the gear shaft 57. Lugs 116 are secured to the main plate 39 to prevent the fingers 114 from falling into engagement with the gears on the gear shaft 55 when said shaft is in its lowered or operating position and to prevent said fingers from interfering with the operation of the gears.

Some of the features above described are new and some are old and have been used prior to our invention. In the appended claims we have endeavored to point out, in accordance with the patent statutes, those features which are new.

Damping mechanism

When the shaft 90 is actuated under the influence of the spiral spring 35, the internal structure of the fare indicator is subjected to rather violent shock and it has been found necessary to provide means which will absorb and dampen the vibrations and which will act as a brake.

In Figure 9 there is disclosed one mechanism for subserving this purpose. The gear 117 on the cam shaft 90 drives the gear 118 which is composed of pins arranged parallel and in a circle and which has secured thereto the gear 119. A spring 120 is coiled around the pin gear to prevent back-lash, and is attached to the gear 119 at one end by means of a set screw 121. The gear 119 drives a small gear 122 and a large gear 123 on the same shaft as the small gear 122 drives in its turn the small gear 124. The shaft of the small gear 124 carries a fan 125. The fan 125 is caused to rotate at a very high speed under the action of the train of gears described and shown in Figure 9 and in so rotating it absorbs a great amount of energy and acts as an effective damping medium for the fare indicator.

In Figure 12 we have illustrated another form of damping mechanism that may be employed. The ratchet wheel 126 is driven from the cam shaft 90 thru any suitable gear arrangement at a very high velocity and causes the pivoted mass 127 to oscillate with a high period between stops defined by the U-shaped bracket 128 which is secured to the main plate 39. In so oscillating the mass 127 absorbs a great deal of energy and acts as an effective brake for the fare indicator. The angle of vibration of the mass 127 is necessarily rather small or else the metal of the arm connecting it to its pivoted pin would become so fatigued as to cause it to fracture. If desired the mass 127 and the bracket 128 may be made of such metal as to cause said mass and bracket to emit a bell-like sound as the mass vibrates, so as to give the passenger an acoustical warning that the fare indicator has begun operating.

*Automatic electrically illuminated indicator*

Owing to the difficulty experienced by the public, at night, or on dark days, or when the taxicab is at a distance, in determining whether or not the taxicab is occupied, it became necessary to provide electrically illuminated means adapted to be placed in an auspicious place on the taxicab to indicate in a conspicuous manner whether or not said taxicab was occupied. Means of this general character, it is true, have been used before the present invention but the means devised by us and forming one of the most important features of the present invention are characterized by their simplicity and effectiveness in service, and by being automatically operated by the fare indicator in such manner as to take the control thereof completely out of the hands of the driver.

The short arm 91 of the bell-crank lever 92 acts upon a plunger 129 which extends thru an insulating bushing 130 and operates the three-contact switch shown in Figure 9. This switch comprises an outer casing 131 which houses an insulating plate 132. Extending thru the insulating plate are two screw contacts 133 and 134 and secured to the plate is a curved bracket contact 135. A leaf spring 136 is secured to the screw 133 and is adapted to establish the electric circuit either between contacts 133 and 134 or between contacts 133 and 135 depending upon the position of the plunger 129. The plunger, 129, may be made of insulating material if desired to insure against a short circuit through the meter.

When the raised portion of the cam on the cam shaft 90 acts upon the short arm 91 of the bell-crank lever 92, the plunger is in the position shown in Figure 9, the leaf spring 135 is flexed and the circuit is established between contacts 133 and 134 causing the electric lights 137 and 138 to be illuminated. When the flat portion of the cam acts on the bell-crank lever the plunger allows the leaf spring to establish the circuit thru the contacts 133 and 135 and the electric lights 139 and 140 are illuminated. Any suitable source of electricity such as the storage battery of the automobile may be used to supply the current to the lights.

Inasmuch as the control of the fare indicator is automatically taken out of the hands of the driver by the spiral spring, 35, operating as heretofore described and inasmuch as the illuminating means are automatically controlled by the fare indicator, it will be seen that the illuminating means are taken out of the control of the driver also.

Figure 14:
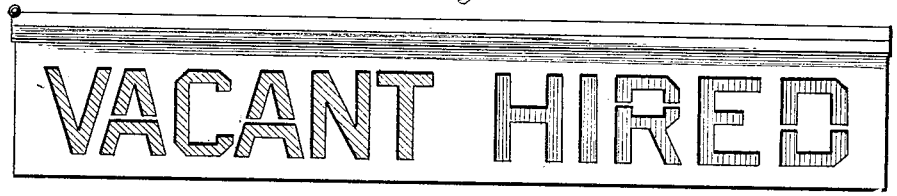
Figure 14 is a front view of a suitable sign that may be employed as the illuminating device.
Figure 15:
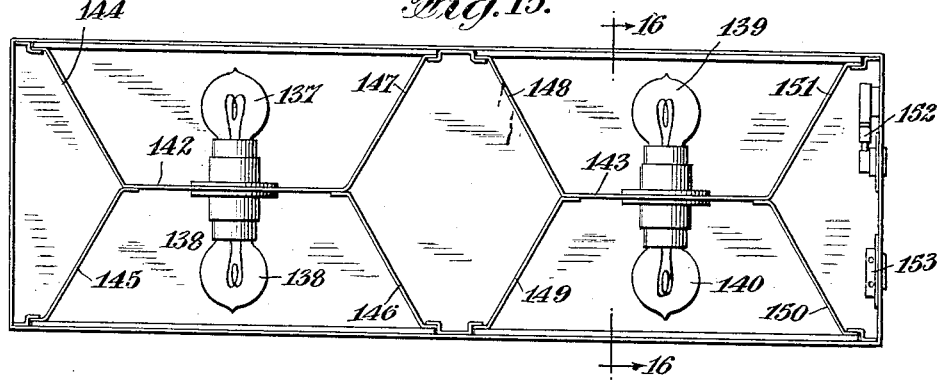
Figure 15 is a plan view thereof with the cover removed.
Figure 16:
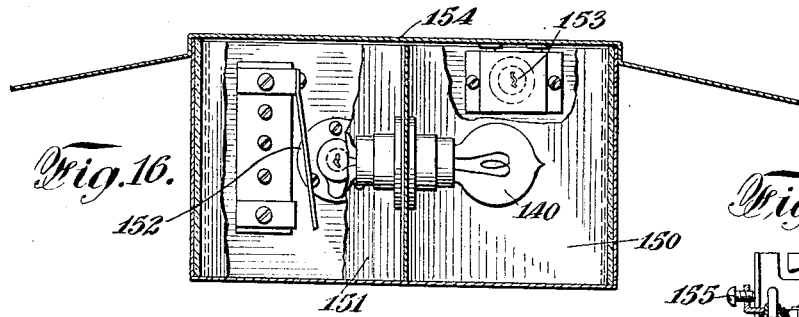
Figure 16 is a sectional view on the line 16—16 of Figure 15, with parts broken away to show the key operated means controlling the action of the illuminating device.

The lights 137 and 138 and the lights 139 and 140 may be of different colors such as green and red so that when the cab is vacant the green light will be illuminated and when the cab is occupied the red light will be illuminated, thus informing the public in an effective manner whether or not the cab is occupied. Instead of this expedient signs of the character shown in Figure 14 and comprising letters thru which the light is adapted to shine may be used so that when the bulbs 137 and 138 are lighted the word "Vacant" will be illuminated and when the bulbs 139 and 140 are lighted, the word "Hired" will be illuminated.

It will be apparent that the underlying principle of the invention—that is, the use of electrically illuminated means for indicating whether the conveyance is occupied or vacant automatically operated by the fare indicator and in such a way as to take the control thereof out of the hands of the driver—is susceptible of wide variations in operative structures and that many varieties of different signs may be employed within the spirit and without departing from the principles of the invention. A sign which we have found to be particularly effective, however, is shown in Figures 14 to 17 inclusive of the drawings.

This sign comprises a substantially rectangular casing or receptacle both sides of which are adapted to be illuminated and thru the top of which the light units 137 and 138 and 139 and 140 are adapted to be inserted. Each light unit comprises two opposed lights which are carried by the metallic removable reflectors 142 and 143. Each of the reflectors have projecting therefrom obliquely, the arm elements 144 to 147 and 148 to 151 inclusive which serve to divide the receptacle into four light proof compartments. The reflectors and the arms are so shaped that a maximum reflection is obtained, which is further augmented by having the reflecting surface highly polished. In fact with these reflectors, lights of as low as two candle power are visible at as great a distance as one-eighth of a mile. The ends of the arms are bent at oblique angles and said ends are adapted to slide in guideways provided on the interior walls of the receptacle so that the light units may be easily withdrawn thru the top of the receptacle and easily reinserted into place if desired. Internally and on the side of the receptacle may be secured any suitable key operated switch such as indicated at 152. A lock 153 may also be provided for the purpose of locking the pivoted cover 154 on the receptacle.

The purpose of the switch 152, is to enable the owner to effectively prevent the driver of the conveyance from taking the same without his permission, for unless the owner of the conveyance has turned the key to establish the circuit the sign will not operate and police officers on duty will be aware that something is wrong. Also, if the driver has been guilty of misconduct, the police officer can prevent him from operating the conveyance further by turning the key to break the circuit and render the same inoperative, for if the driver attempts to operate the conveyance afterwards police officers on duty will note that the sign is not functioning and will investigate. It will be understood that keys for the switch are held only by the owner and police officers or others in authority.

Figure 17:
Figure 17 is a view showing suitable types of lights that may be employed with the illuminating device.
Figure 13:
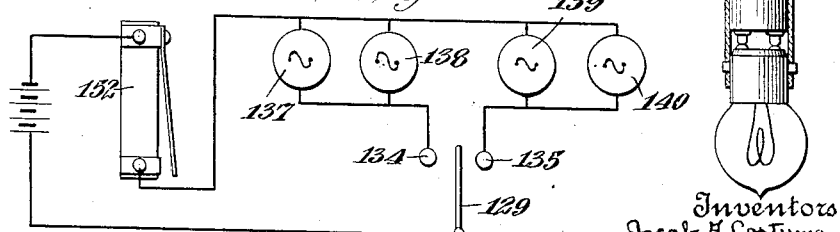
Figure 13 is a view of the circuits employed with the automatic electrical indicating means.

Any suitable type of lights may be employed with the above described. Such a light as is shown in Figure 17 has been found to be particularly suitable for use therewith. This light comprises the usual two-way socket which has been so modified as to provide two contact members 155 and 156 for the electric wires. Both the electric lights are connected in parallel so that they are both lighted when the circuit is completed thru the contacts 155 and 156.

The foregoing description of the invention and the novel features characterizing the same has been made in accordance with the patent statutes and in such a way that one skilled in the art can make and use the invention. It is apparent, however, that many variations, alterations and modifications may be made in the specific structures described without departing from the principles and the teachings of the invention, and we aim to embrace as part of our invention all such variations, alterations and modifications as will naturally and spontaneously occur to a skilled mechanic and one versed in this art, and we desire to be limited only by the condition of the prior art and the scope of the appended claims.

What we claim is:

1. In a fare indicator a plunger, a switch controlled thereby, a circuit controlled by the switch, an electrical illuminating device in the circuit, a shaft extending thru the fare indicator, said shaft being adapted to control the fare registering parts of the indicator, and a cam carried by the shaft and adapted to actuate the plunger.

2. In a fare indicator, a three-contact switch, two circuits controlled thereby, said switch in one position being adapted to complete one circuit and in another position to complete the other circuit, electrical illuminating devices in the circuit, a plunger for operating the switch, and means for simultaneously actuating the plunger and the fare registering parts of the indicator.

3. In a fare indicator a three-contact switch, two circuits controlled thereby, said switch in one position being adapted to complete one circuit and in another position to complete the other circuit, a shaft extending thru the fare indicator, said shaft being adapted to control the fare registering parts of the indicator, a plunger for actuating the switch and a cam carried by the shaft adapted to control the position of the plunger.

4. In a fare indicator a casing, an insulating plate supported in the casing, three contacts carried by the plate, a conductive member secured to one contact and adapted to engage with either of the other contacts, a shaft extending thru the fare indicator, said shaft being adapted to control the fare registering parts of the indicator, a plunger for controlling the position of the conductive member, and a cam on the shaft for actuating the plunger.

5. In a fare indicator an insulating base, a contact extending thru the base, a second contact also extending thru the base, a conductive member secured to the first contact, a third contact carried by the base and curved to overlap the second contact, said conductive member being adapted to engage with either the second or the third contacts, and means operated by the fare indicator for simultaneously controlling the position of said conductive member and the fare registering parts of the indicator.

6. In a fare indicator, a controlling shaft, a flag secured thereto, and a ratchet mechanism for intermittently rotating the shaft.

7. In a fare indicator, a controlling shaft having a plurality of notches on its circumference, a flag secured thereto, a loose sleeve surrounding the shaft, a spring-pressed plunger in the sleeve adapted to cooperate with the notches in the shaft, and an operating handle attached to the sleeve.

8. In a fare indicator, a controlling shaft, a flag secured thereto, a loose sleeve surrounding the shaft, an operating handle attached to the sleeve, and cooperating means on the sleeve and shaft for causing rotation of the shaft when the handle is turned in one direction only.

9. In a fare indicator, a controlling shaft, a flag secured thereto, a ratchet mechanism for intermittently rotating the shaft, an operating handle for the ratchet mechanism, and stops for limiting the angular stroke of the operating handle.

10. In a fare indicator, a controlling shaft having three notches equiangularly arranged about its circumference, a flag secured to the shaft, a loose sleeve encircling said shaft, a spring-pressed plunger in the sleeve adapted to co-operate with the notches, an operating handle attached to the sleeve, and stops to limit the angular stroke of the handle to 120 degrees.

11. In a fare indicator, a controlling shaft having a notch on its circumference, said notch comprising two sides one of which is radial and the other substantially perpendicular thereto, a flag secured to the shaft, a loose sleeve encircling the shaft, an operating handle attached to the sleeve, and a spring-pressed plunger in the sleeve adapted, when the handle is turned in one direction to cooperate with the radial side of the notch to cause rotation of the shaft.

12. In a fare indicator having a back plate, a controlling shaft projecting through the back plate, a flag exteriorly secured thereto, and a ratchet mechanism disposed between the flag and the back plate for intermittently rotating the shaft.

13. In a taximeter, a shaft, a fare indicating wheel on said shaft, a gear on the shaft, a countershaft, a gear on the countershaft, a bracket carrying the countershaft, means for pivotally supporting said bracket, an operating shaft, means for controlling the bracket from the operating shaft to cause the gears to mesh and unmesh, a ratchet wheel on the shaft of the fare indicating wheel, and a pawl adapted to cooperate with the ratchet wheel when the gears are in meshing position and to be automatically withdrawn from cooperating engagement with the ratchet wheel when the gears are in unmeshing position.

14. In a taximeter, a shaft, a fare indicating wheel on said shaft, a heart-shaped cam on the shaft, a gear on the shaft, a countershaft, a gear on the countershaft, a bracket carrying the countershaft, means for pivotally supporting said bracket, an arm carried by said means last-named, said arm having an oblique end to cooperate with the heart-shaped cam, an operating shaft, and means for controlling the bracket from the operating shaft to simultaneously cause the gears to unmesh and the arm to act upon the heart-shaped cam to restore the fare indicating wheel to its initial position.

15. In a fare indicator, a shaft, a fare indicating wheel on the shaft, a gear on the shaft, a countershaft, a gear on the countershaft, a bracket carrying the countershaft, a shutter, a rod for simultaneously operating the bracket and shutter, and means for operating the rod.

16. In a fare indicator, a shaft, a fare indicating wheel on the shaft, a gear on the shaft, a countershaft, a gear on the countershaft, a bracket carrying the countershaft, a shutter, a pin associated with the shutter, a rod, means for operating the rod, means operatively connecting the rod with the bracket, and a projection on the rod cooperating with the pin.

17. In a fare indicator, a three-contact switch, two circuits controlled thereby, said switch in one position being adapted to complete one circuit and in another position to complete the other circuit, electrical illuminating devices in the circuits, means for actuating the switch, said means including a shaft and a cam on the shaft, and means for rotating the shaft step by step.

18. In a fare indicator having a front plate and a back plate, a controlling shaft associated with the fare indicator and adapted to control the fare registering parts of the indicator, a plunger extending transversely between the front and back plates, means on the shaft for operating the plunger, a switch actuated by the plunger, a circuit controlled by the switch, and an illuminating device in the circuit.

19. In a fare indicator having a front plate and a back plate, a controlling shaft associated with the fare indicator and adapted to control the fare registering parts of the indicator, a plunger extending transversely between the front and back plates, a cam on the shaft for operating the plunger, a three-contact switch actuated by the cam, a plurality of circuits controlled by the switch, and illuminating devices in the circuits.

In testimony whereof, we have signed our names to this specification this 21st day of May, 1926.

JACOB A. COSTUMA.
HARRY E. BAUER.
CHARLES L. LOVERCHECK.